Nov. 24, 1970    J. WAHNSCHAFFE ET AL    3,541,785
EXHAUST GAS LINE CONNECTED TO THE CYLINDER
HEADS OF AN INTERNAL COMBUSTION ENGINE
Filed May 28, 1968
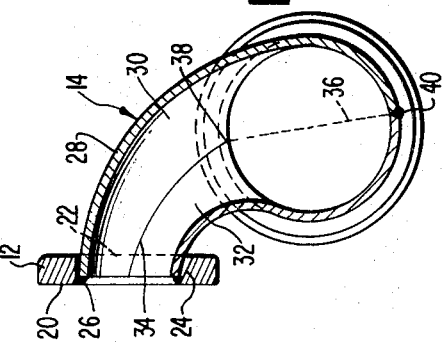
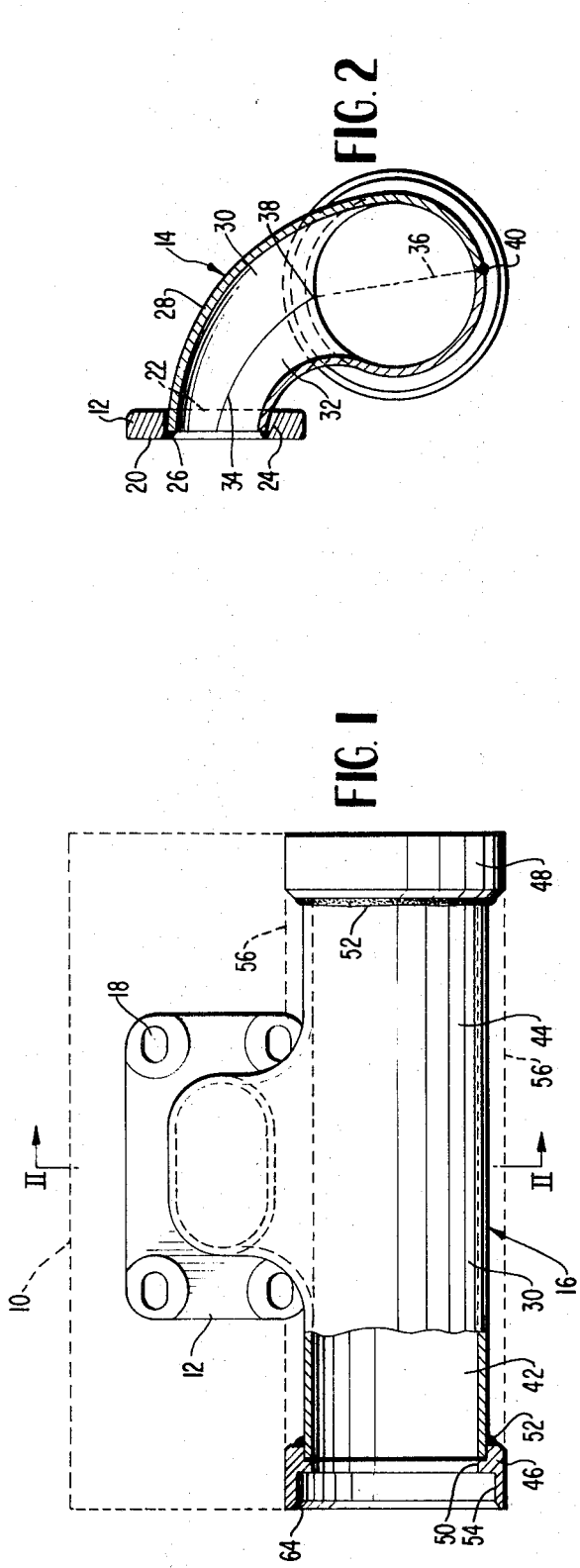
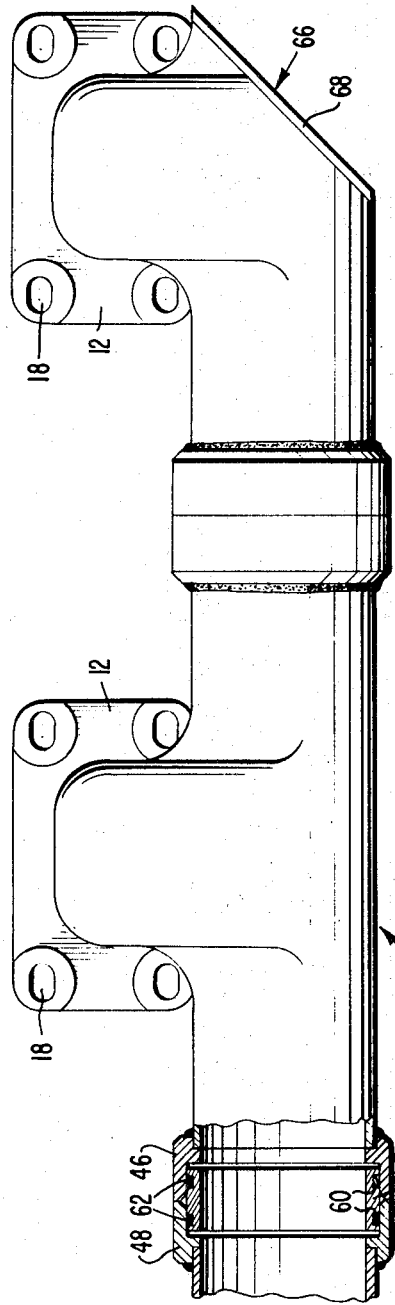
INVENTORS
JUERGEN WAHNSCHAFFE
WOLFGANG RUDERT
BY
Craig & Antonelli
ATTORNEYS

United States Patent Office

3,541,785
Patented Nov. 24, 1970

3,541,785
EXHAUST GAS LINE CONNECTED TO THE CYLINDER HEADS OF AN INTERNAL COMBUSTION ENGINE
Jürgen Wahnschaffe, Stuttgart-Stammheim, and Wolfgang Rudert, Grunbach Kreis Waiblingen, Germany, assignors to Daimler-Benz Aktiengesellschaft, Stuttgart-Unterturkheim, Germany
Filed May 28, 1968, Ser. No. 732,758
Claims priority, application Germany, May 31, 1967, 1,576,357
Int. Cl. F01n 7/10; F16l 17/02
U.S. Cl. 60—29   23 Claims

ABSTRACT OF THE DISCLOSURE

An exhaust gas line to be connected to the cylinder heads of an internal combustion engine, in which the discharge elbow pipes pass over into pipe line sections that can be assembled according to the building block principle by connecting pieces; a given discharge elbow pipe is connected to its cylinder by means of a flange of high inherent rigidity and the pipe line sections are also provided at their ends with flanges of inherent rigidity; each pipe line flange forms a connecting element with the next adjacent pipe line section and at least the pipe line sections, however preferably also the discharge elbow pipes are made from high heat-resistant sheet metal.

BACKGROUND OF THE INVENTION

The present invention relates to an exhaust gas line connected to the cylinder heads of an internal combustion engine in which the discharge elbows pass over into pipe line sections that are adapted to be assembled by connecting elements according to the building block principle.

Prior art exhaust gas lines of this type, in which the same structural parts can be used independently of the cylinder number, are made of cast parts that have a relatively large wall thickness. This has a consequence that the exhaust gas lines require a large amount of space, particularly if the lines are to be protected by an insulation against energy loss as is customary with engines, whose exhaust gases drive exhaust gas turbo chargers.

One necessitates relatively complicated casting molds for the casting of these known hollow bodies. In the finished condition and mounted at the engine, they distort and warp in an uncontrollable manner above all also at their sleeves, which is not surprising because temperatures of 600 to 800° C. occur in exhaust gas lines. Another disadvantage of the prior art exhaust gas lines assembled according to the building block principle resides in that the partial section into which the cylinder located farthest upstream feeds into exhaust gas, is required as an additional part. One requires therefor a further casting mold and special castings.

SUMMARY OF THE INVENTION

It is an aim of the present invention to provide pipe line sections which are light-weight, inexpensive and space-saving as well as insensitive with respect to tolerances and thermal expansions.

As a solution to the underlying problems, the present invention provides that an elbow flange connected with the respective cylinder head is a flange of high inherent rigidity, that the line sections are provided at their ends each with a pipe-line flange of high inherent rigidity which is the connecting element to the next pipe line section, and that at least the pipe line sections consist of high heat-resistant sheet metal material.

According to a further feature and development of the present invention, the pipe line sections can be further improved if the discharge elbow pipe also consists of high heat-resistant sheet metal. One has therewith the possibility to manufacture the exhaust gas line, insofar as it consists of sheet metal, of two easily manufacturable parts, to reduce the dimensions of the exhaust gas line and to make the same still more light-weight.

A solution particularly favorable from a technological point of view is achieved if the discharge elbow pipe and the pipe line section consist altogether of two half-shells which are welded together along the edge areas thereof abutting against each other in the assembled condition. Such half-shells can be manufactured in a simple manner from a drawing technological point of view, they can be simply stacked into one another and offer edge areas favorable positioned for the welding.

A particularly advantageous subdivision into two half-shells results if the separating plane of the pipe line section and the separating plane extending through the discharge elbow pipe are disposed tangent to one another in the center axis of the discharge pipe elbow at the transition of the pipe line section into the discharge elbow pipe.

It is also favorable if the pipe line flange has an external radius that is larger than the external radius of the pipe line section. It is possible thereby to retain the insulation between the mutually facing end faces of the pipe line flanges of a given pipe line section so that the insulation cannot slide off and is protected considerably better against shock and impact. One can use these end faces as part of a form that retains the insulation also at the completed pipe line section. Additionally, the advantage automatically results therefrom that the pipe line flanges are disposed exposed in the assembled exhaust gas line and therefore are cooled by the ambient surrounding air. As a result thereof, the connection of pipe line section to pipe line section to be cooled in any case is also cooled without any further measures.

Without having to increase the external dimensions of the exhaust gas line at the joint place of pipe line section to pipe line section, one can insert into successive pipe line flanges connecting pieces which are provided with external seals that cooperate with the inner surface of the rings. The enlarged external radius of the pipe line flanges is additionally utilized thereby.

A particularly good seal for heavy duty operating conditions is achieved if the external ring seals are piston lamellae rings. These rings provide a seal even if the geometric longitudinal axes of the pipe line sections are not aligned.

The same work tools suffice for the manufacture of all pipe line sections if the pipe line section disposed farthest upstream is devoid of one of the pipe pieces and the thus resulting aperture is closed by a sheet metal piece. One then simply cuts the missing pipe piece from a half-shell blank or also from a finished pipe line section and closes the same by means of a sheet metal piece.

It has proved particularly favorable from a manufacturing point of view if an insulation is mounted between the pipe-line flanges on the sheet metal parts which has a radius approximately equal to the outer diameter of the pipe line flanges. This produces a smooth-surfaced exhaust gas line and simultaneously a simple measure for the thickness of the insulating layer.

Accordingly, it is an object of the present invention to provide an exhaust gas line for internal combustion engines which avoids by simple means the aforementioned shortcomings and drawbacks encountered in the prior art.

Another object of the present invention resides in an exhaust gas line for internal combustion engines which minimizes the space requirements and permits simple accommodation of an insulation.

A further object of the present invention resides in an exhaust gas line for the cylinder heads of an internal combustion engine which can be manufactured in a simple and inexpensive manner yet permits use of the standard sections for all parts of the exhaust gas line regardless of the number of cylinders.

A still further object of the present invention resides in an exhaust gas line of the type described above which is relatively insensitive as regards tolerance limits as well as thermal expansions.

Still another object of the present invention resides in an exhaust gas line for internal combustion engines which not only has smaller external dimensions but can be constructed more light weight with the use of relatively inexpensive materials.

Still another object of the present invention resides in an exhaust gas line for internal combustion engines which can be easily assembled, obviates the need for exact tolerances and alignment of the individual sections and favors the natural cooling of the connections between individual sections.

These and further objects, features and advantages of the present invention will become more obvious from the following description when taken in connection with the accompanying drawing which shows, for purposes of illustration only, one embodiment in accordance with the present invention, and wherein:

FIG. 1 is a side elevational view of one partial standard section of an exhaust gas line in accordance with the present invention, shown partly in cross section;

FIG. 2 is a transverse cross-sectional view taken along line II—II of FIG. 1; and FIG. 3 is a plan view, partly in cross section, of partial sections of an exhaust gas line in accordance with the present invention connected with each other.

Referring now to the drawing wherein like reference numerals are used throughout the various views to designate like parts, reference numeral 10 designates in FIG. 1 a cylinder head, indicated in dash lines, at which is secured with the aid of bolts (not shown) an elbow flange 12 of a partial standard section generally designated by reference numeral 14 of an exhaust gas line 16 constructed according to the building block principle; the bolts (not shown) are inserted through four elongated apertures 18 provided in the corner areas of the elbow flange 12. The elbow flange is finely machined and finished on its surface 20 facing the cylinder head 10 in order that the surface 20 sealingly abuts at the corresponding surface of the cylinder head 10. In its center area the elbow flange 12 is provided with a rectangular aperture 22 having rounded-off corners. The boundary surfaces of the aperture 22 at the elbow flange 12 extend perpendicularly to the surface 20 with the exception of the lower boundary surface 24 which assumes an angle of about 60° to the surface 20. An exhaust or discharge elbow 28 is welded into the aperture 22 with the aid of a seam 26 in the position of the elbow visible from this figure of the drawing. The discharge elbow 28 is a part composed of two half-shells 30 and 32 which abut against each other in a first separating plane 34 and in a second separating plane 36 which are both disposed in FIG. 2 perpendicularly to the plane of the drawing and are tangential to each other at the point 38. The trace of the separating plane 34 in the plane of the drawing of FIG. 2 is simultaneously the center axis of the discharge elbow 28. The two half-shells 30 and 32 are welded to each other at their mutually opposite edge areas by V-seams 40. They consist of austenitic, light-heat-resistant sheet metal whereas the elbow flange 12 consists of malleable cast iron. A scaling or flaking of this arrangement is therefore precluded. The free ends of the pipe line pieces 42 and 44 carry pipe line flanges 46 and 48 whose outer dimeters are larger than the diameter of the pipe line sections 42 and 44. An internal projection 50 serves as abutment during the assembly of the pipe line flange 46 or 48 on the pipe line section 42 or 44.

The pipe line flanges 46 and 48 are connected with the pipe line sections 42 and 44 by welding seams 52. The pipe line flanges 46 and 48 are each provided with a recess or bore having an internal surface 54. An insulation 56 may be applied over the welded-together half-shells 30 and 32 which is indicated in dash line in FIG. 1 and which has a thickness within the area of the pipe line pieces 42 and 44 as well as within the area of the discharge elbow 28 that corresponds to the difference between the outer diameter of the pipe line flanges 46 and 48 and of the pipe line sections 42 and 44.

One connects the individual partial sections of an exhaust gas line as indicated in FIG. 3. For that purpose a connecting pipe element 58 be inserted into the bore forming the internal surface 54 of two adjacent pipe line flanges 46 and 48; the connecting pipe element 58 has approximately the same internal diameter as the pipe line sections 42 and 44 but its outer diameter is smaller than that of the internal surface 54. Piston lamellae rings 62 are inserted into two circumferential grooves 60 which cooperate sealingly with the opposite internal surfaces 54 of the respective pipe line flanges 46 and 48. As can be seen from FIG. 3, it is possible with this construction to connect with each other also pipe line sections 42 and 44 that are not accurately aligned. This capability depends, on the one hand, from the aforementioned diameter ratio of the connecting pipe element 58 and of the inner surface 54 and, on the other, on the bevelling 64 at the end surfaces of the pipe line flanges 46 and 48. With this type of sleeve connection, the cross-section for the gas flow is not reduced, and the relative movability of the individual standard partial sections 14 remains preserved. Nevertheless, one achieves a very good seal.

It also follows additionally from FIG. 3 that one can readily manufacture the partial section 66 disposed farthest upstream without any difficulty in that one cuts off the pipe line piece 44 for the largest part and closes the thus-resulting aperture by a sheet metal plate 68.

If the pipe line flanges of successive partial sections are not disposed in direct proximity to one another then the connecting pipe element 58 has to be constructed correspondingly longer and may possibly even be curved.

While we have shown and described only one embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are within the scope of those skilled in the art.

We claim:

1. An exhaust gas line adapted to be connected to the cylinder heads of an internal combustion engine in which the exhaust elbows pass over into pipe line sections that are adapted to be assembled according to the building block principle by means of connecting elements, characterized by a massive, strong elbow flange means of high inherent rigidity for a respective exhaust elbow, to be connected to a respective cylinder head, said flange means being welded to a respective exhaust elbow to form a unitary, integral part therewith, each pipe line section being provided at the ends thereof with a massive, strong pipe line flange means of high inherent rigidity which is rigidly connected with a corresponding pipe line section to form a unitary, integral part therewith, said pipe line flange means constituting a connecting element to the next pipe line section, and at least the pipe line sections essentially consisting of high-heat-resistant sheet metal material.

2. An exhaust gas line adapted to be connected to the cylinder heads of an internal combustion engine in which the discharge elbows pass over into pipe line sections that are adapted to be assembled according to the building block principle by means of connecting elements, wherein the improvement comprises elbow flange means for a respective discharge elbow of high inherent rigidity, each pipe line section being provided at the ends thereof with pipe line flange means of high inherent rigidity forming a connecting element to the next pipe line section, and at least the pipe line sections essentially consisting of high-heat-resistant sheet metal material, a given discharge elbow pipe essentially also consisting of high heat-resistant sheet metal material, and the discharge elbow pipes and the pipe line sections consisting of two half-shells that are welded to each other along the edge areas which abut against each other in the assembled condition.

3. An exhaust gas line adapted to be connected to the cylinder heads of an internal combustion engine in which the discharge elbows pass over into pipe line sections that are adapted to be assembled according to the building block principle by means of connecting elements, wherein the improvement comprises elbow flange means for a respective discharge elbow of high inherent rigidity, each pipe line section being provided at the ends thereof with pipe line flange means of high inherent rigidity forming a connecting element to the next pipe line section, and at least the pipe line sections essentially consisting of high-heat-resistant sheet metal material, the discharge elbow pipes and the pipe line sections consisting of two half-shells that are welded to each other along the edge areas which abut against each other in the assembled condition.

4. An exhaust gas line according to claim 1, wherein a given discharge elbow pipe essentially also consists of high heat-resistant sheet metal material.

5. An exhaust gas line according to claim 2, wherein the separating plane of the pipe line sections and the curved separating surface extending through the discharge elbow pipe and is disposed in the center axis of a respective discharge elbow pipe, are tangent to one another at the transition of the pipe line section to the discharge elbow pipe.

6. An exhaust gas line according to claim 5, wherein the pipe line flange means have an external radius that is larger than the external radius of the pipe line section.

7. An exhaust gas line according to claim 6, wherein the pipe line flange means are turned rings.

8. An exhaust gas line according to claim 7, wherein a connecting element is provided in each two successive pipe line flange means including external ring seal means cooperating with the internal surfaces of the pipe line flange means.

9. An exhaust gas line according to clim 8, wherein the external ring seal means are piston lamellae rings.

10. An exhaust gas line according to claim 9, wherein the pipe line section disposed farthest upstream is devoid of a portion of one of the pipe sections and the thus-resulting aperture is closed by a sheet metal piece.

11. An exhaust gas line according to claim 10, further comprising an insulating layer applied on the sheet-metal parts between the pipe line flange means which has an external diameter corresponding approximately to that of the flange means.

12. An exhaust gas line according to claim 1, wherein the pipe line flange means have an external radius that is larger thn the external radius of the pipe line section.

13. An exhaust gas line according to claim 12, wherein the pipe line flange means are turned rings.

14. An exhaust gas line according to claim 12, wherein a connecting element is provided in each two successive pipe line flange means including external ring seal means cooperating with the interal surfaces of the pipe line flange means.

15. An exhaust gas line according to claim 14, wherein the external ring seal means are piston lamellae rings.

16. An exhaust gas line according to claim 1, wherein the pipe line section disposed farthest upstream is devoid of a portion of one of the pipe sections and the thus-resulting aperture is closed by a flat sheet metal piece.

17. An exhaust gas line according to claim 1, further comprising an insulating layer applied on the sheet metal parts between the pipe line flange means which has an external diameter corresponding approximately to that of the flange means.

18. An exhaust gas line according to claim 1, wherein the pipe line flange means are turned rings.

19. An exhaust gas line according to claim 1, wherein a connecting element is provided in each two successive pipe line flange means including external ring seal means cooperating with the internal surfaces of the pipe line flange means.

20. An exhaust gas line according to claim 19, wherein the external ring seal means are piston lamellae rings.

21. An exhaust gas line according to claim 2, further comprising an insulating layer applied on the sheet metal parts between the pipe line flange means which has an external diameter corresponding approximately to that of the flange means.

22. An exhaust gas line according to claim 16, wherein the resulting aperture is disposed in a plane forming a non-perpendicular angle to the axis of the corresponding pipe line section and to the axis of the respective elbow at the point of connection with the last-mentioned pipe line section in such a manner that the exhaust gases flowing out of said last-mentioned elbow are deflected into the last-mentioned pipe line section by said flat sheet-metal piece.

23. An exhaust gas line according to claim 3, wherein the separating plane of the pipe line sections and the curved separating surface extending through the discharge elbow pipe and disposed in the center axis of a respective discharge elbow pipe, are tangent to one another at the transition of pipe line section to the discharge elbow pipe.

References Cited
UNITED STATES PATENTS

| | | | |
|---|---|---|---|
| 1,271,779 | 7/1918 | Schroeder | 60—29 |
| 2,667,151 | 1/1954 | Marx | 60—29 |
| 2,862,731 | 12/1958 | Hedden | 285—370 |
| 2,886,945 | 5/1959 | Hofer | 60—29 |
| 3,177,649 | 4/1965 | Tremel | 60—29 |
| 3,380,246 | 4/1968 | Dowell | 60—29 |

FOREIGN PATENTS 673,277   6/1952   Great Britain.

DOUGLAS HART, Primary Examiner

U.S. Cl. X.R.

285—370

UNITED STATES PATENT OFFICE
CERTIFICATE OF CORRECTION

Patent No. 3,541,785              Dated November 24, 1970

Inventor(s) Jürgen Wahnschaffe et al.

It is certified that error appears in the above-identified patent and that said Letters Patent are hereby corrected as shown below:

In the heading to the printed specification, line 10, "1,576,357" should read -- D 53 204 Ia/46c$^1$ --.

Signed and sealed this 20th day of April 1971.

(SEAL)
Attest:

EDWARD M. FLETCHER, JR.                WILLIAM E. SCHUYLER, JR
Attesting Officer                      Commissioner of Patents